(12) United States Patent
Waters (10) Patent No.: US 6,376,000 B1
(45) Date of Patent: Apr. 23, 2002

(54) METHOD OF CREATING PAINTED CHOCOLATE

(76) Inventor: Peter B Waters, 2 Split Oak Dr., East Norwich, NY (US) 11732

( * ) Notice: Subject to any disclaimer, the term of this patent is extended or adjusted under 35 U.S.C. 154(b) by 0 days.

(21) Appl. No.: 09/477,002

(22) Filed: Jan. 3, 2000

(51) Int. Cl.[7] ................................................. A23G 3/00
(52) U.S. Cl. ....................... 426/383; 426/249; 426/302; 426/306; 426/515; 426/87; 426/93; 426/104
(58) Field of Search .......................... 426/87, 104, 383, 426/93, 515, 249, 306, 302

(56) References Cited

U.S. PATENT DOCUMENTS

| | | | | |
|---|---|---|---|---|
| 919,736 A | * | 4/1909 | Loesch | 426/87 |
| 2,394,322 A | * | 2/1946 | McKee | 426/87 |
| 2,435,047 A | * | 1/1948 | McKee | 426/87 |
| 2,895,832 A | * | 7/1959 | Bersey | 426/383 |
| 4,285,978 A | * | 8/1981 | Quinlivan | 426/87 |
| 4,455,320 A | | 6/1984 | Syrmis | 426/383 |
| 4,560,562 A | * | 12/1985 | Schroeder | 426/87 |
| 4,668,521 A | | 5/1987 | Newsteder | 426/87 |

(List continued on next page.)

FOREIGN PATENT DOCUMENTS

| | | | | |
|---|---|---|---|---|
| CA | 2057985 | * | 6/1993 | 426/87 |
| CH | 298862 | * | 9/1954 | 426/383 |
| GB | 838948 | * | 6/1960 | 426/104 |
| JP | 62-36151 | * | 2/1987 | 426/87 |
| JP | 1-235546 | * | 9/1989 | 426/87 |
| JP | 1-50376 | * | 10/1989 | 426/104 |
| WO | WO95/01735 | * | 1/1995 | 426/104 |
| WO | WO97/27759 | * | 8/1997 | 426/383 |
| WO | WO 97/43908 | * | 11/1997 | 426/383 |

OTHER PUBLICATIONS

Swiss Colony, Christmas Gift Book, 1982 Copy in 426/104 1982.*
Photographic, p. 14 Copy in 426/104 Sep. 1988.*
Printout of Website for Lucks. com No Date.
Printout of Website for Printing Images CtC, Inc. No Date.
Printout of Website for "Your Face On a Cake" No Date.
Printout of Website for "Edible Cake Art" No Date.
Printout of Website for "Icing Images" No Date.
Printout of Website for "Cake Top Publisher" No Date.
Printout of Website for DecoPac No Date.
Press release from Lumina Office Products No Date.

Primary Examiner—Steven Weinstein
(74) Attorney, Agent, or Firm—Michael I. Kroll (57) ABSTRACT

A method of forming chocolate mold having an image printed thereon. The method includes the steps of forming a piece of edible paper, releasably securing a first side of the edible paper to a backing sheet, printing an image on a second side of the edible paper and securing the edible paper to the chocolate mold. The image is printed on the edible paper by a printer using food coloring loaded into a cartridge of the printer. The step of securing the edible paper to the chocolate mold may include placing the edible paper within a mold with the image facing a side of the mold, pouring chocolate into the mold and atop the edible paper, allowing the chocolate poured into the mold to harden and removing the hardened chocolate and edible paper from the mold. The hardening of the chocolate forms a bond between the chocolate and the edible paper it is poured atop. Alternatively, the step of securing the edible paper to the chocolate mold may include pouring chocolate into a mold, allowing the chocolate poured into the mold to harden, removing the hardened chocolate from the mold and securing the edible paper to a desired position on the hardened chocolate. In this instance, the edible paper is secured to the hardened chocolate with an edible adhesive such as gum arabic.

3 Claims, 7 Drawing Sheets

U.S. PATENT DOCUMENTS

| | | | |
|---|---|---|---|
| 4,668,523 A | | 5/1987 | Begleiter .................... 426/104 |
| 4,670,271 A | | 6/1987 | Pasternak .................... 426/90 |
| 4,832,966 A | | 5/1989 | Newsteder ................... 426/87 |
| 4,910,661 A | * | 3/1990 | Barth et al. ................. 426/383 |
| 4,946,696 A | * | 8/1990 | Nendl et al. .................. 426/87 |
| 5,017,394 A | | 5/1991 | Macpherson et al. ....... 426/302 |
| 5,035,907 A | * | 7/1991 | Phillips et al. |
| 5,334,404 A | * | 8/1994 | Garcia et al. ................. 426/87 |
| 5,407,691 A | | 4/1995 | Przelomski et al. ......... 426/249 |
| 5,505,775 A | * | 4/1996 | Kitos .......................... 426/383 |
| 5,547,507 A | * | 8/1996 | Ciaramita ................... 426/383 |
| 5,800,601 A | | 3/1997 | Zou et al. |
| 5,795,395 A | * | 8/1998 | Ben-Matitayhu ............ 426/383 |
| 5,840,355 A | * | 11/1998 | Prescott ....................... 426/87 |
| 6,030,134 A | * | 2/2000 | Stewart |
| 6,058,843 A | * | 5/2000 | Young ........................ 426/383 |

* cited by examiner

METHOD OF CREATING PAINTED CHOCOLATE

BACKGROUND OF THE INVENTION

1. Field of the Invention

The present invention relates generally to methods of forming chocolate and, more specifically, to a method of forming art work on a chocolate mold without causing the chocolate to become unstable and flake.

2. Description of the Prior Art

Numerous methods of placing art work on chocolate molds have been provided in the prior art. An examples of such a method includes hand painting the chocolate bar with a desired image. However, creating a chocolate mold in this manner was very time consuming, labor intensive and tedious. Another attempt at placing art work on a chocolate mold centered around printing a desired image directly on the chocolate. This method printed the image on chocolate which is the wrong color for the image, is oily and has an uneven surface. Thus, this method did not provide consistent and desirable results. Still other methods centered around silk screening images on rice paper and gluing the rice paper to the chocolate. This method required large runs of numerous units and also created chocolate which was unstable and flaked.

While these methods may be suitable for the particular purpose to which they address, they would not be as suitable for the purposes of the present invention as heretofore described.

SUMMARY OF THE PRESENT INVENTION

The present invention relates generally to methods of forming chocolate and, more specifically, to a method of forming art work on a chocolate mold without causing the chocolate to become unstable and flake.

A primary object of the present invention is to provide a method of creating a chocolate mold having art printed thereon that will overcome the shortcomings of prior art devices.

Another object of the present invention is to provide a method of creating a chocolate mold having art printed thereon which is able to provide a stable chocolate bar which does not flake.

A further object of the present invention is to provide a method of creating a chocolate mold having art printed thereon which is able to bond an image to a chocolate bar with a minimal amount of effort while adequately securing the image to the chocolate bar.

A yet further object of the present invention is to provide a method of creating a chocolate mold having art printed thereon wherein the securing of the image to the chocolate bar will not affect the consistency of the chocolate.

A still further object of the present invention is to provide a method of creating a chocolate mold having art printed thereon including printing the image on a piece of edible paper using a conventional color printer filled with food coloring for each color to be used on the image.

A further object of the present invention is to provide a method of creating a chocolate mold having art printed thereon wherein the edible paper containing the image thereon is placed within a mold and chocolate is poured thereon and allowed to harden.

A further object of the present invention is to provide a method of creating a chocolate mold having art printed thereon wherein the edible paper is bonded to the chocolate poured into the mold during hardening.

Another object of the present invention is to provide a method of creating a chocolate mold having art printed thereon that is simple and easy to use.

A still further object of the present invention is to provide a method of creating a chocolate mold having art printed thereon that is economical in cost to manufacture.

Additional objects of the present invention will appear as the description proceeds.

A method of creating a chocolate mold having art printed thereon is disclosed by the present invention. The method includes the steps of forming a piece of edible paper, releasably securing a first side of the edible paper to a backing sheet, printing an image on a second side of the edible paper and securing the edible paper to the chocolate mold. The image is printed on the edible paper by a printer using food coloring loaded into a cartridge of the printer. The step of securing the edible paper to the chocolate mold may include placing the edible paper within a mold with the image facing a side of the mold, pouring chocolate into the mold and atop the edible paper, allowing the chocolate poured into the mold to harden and removing the hardened chocolate and edible paper from the mold. The hardening of the chocolate forms a bond between the chocolate and the edible paper it is poured atop. Alternatively, the step of securing the edible paper to the chocolate mold may include pouring chocolate into a mold, allowing the chocolate poured into the mold to harden, removing the hardened chocolate from the mold and securing the edible paper to a desired position on the hardened chocolate. In this instance, the edible paper is secured to the hardened chocolate with an edible adhesive such as gum arabic.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Turning now descriptively to the drawings, in which similar reference characters denote similar elements throughout the several views, the Figures illustrate the method of creating a chocolate mold having art printed thereon of the present invention. With regard to the reference numerals used, the following numbering is used throughout the various drawing figures.

10 piece of edible paper
12 backing sheet for supporting piece of edible paper
14 color printer cartridge
16 printer
18 processor
20 connection cable connecting processor to printer
22 disk drive
24 keyboard
26 mouse
28 monitor
30 mold
32 face side of edible paper
34 back side of edible paper
36 chocolate
38 edible adhesive
40 image

DETAILED DESCRIPTION OF THE PREFERRED EMBODIMENT

Turning now descriptively to the drawings, in which similar reference characters denote similar elements throughout the several views, FIGS. 1 through 7 illustrate the method of creating a chocolate mold having art printed thereon of the present invention.

Figure 1:
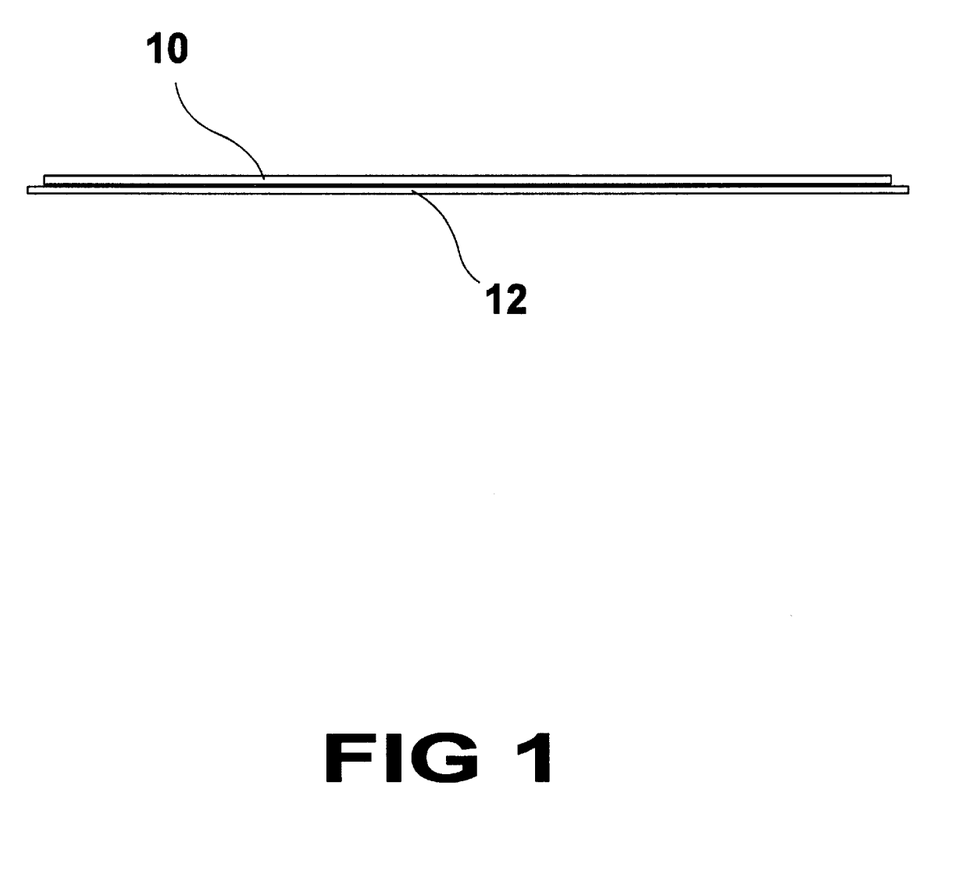
FIG. 1 is a side perspective view of the first step of the method of the present invention for forming a chocolate mold having art printed thereon, placing the edible paper on a sheet of wax paper.

The method of creating chocolate mold having art printed thereon is started by making a piece of edible paper indicated in FIG. 1 by the reference numeral 10. The edible paper is preferably made from sugar, corn syrup, corn starch, microcrystaline cellulose, vegetable oil, titanium dioxide and a preservative. These ingredients are mixed together to form a pasty material and is rolled into a flat sheet. The flat sheet of edible paper 10 is then rolled onto a piece of wax paper or plastic 12 to provide support therefore. The edible paper 10 is rolled into a very thin sheet and left on the wax paper 12. Edible paper 10 such as is made for performing the method of the present invention is similar to products made and used by cake decorating companies for transferring silk screen drawings on to frosting. The cake decorating companies print on the material and place the printed material on a cake where it is allowed to dissolve into the frosting, leaving a picture on the cake. When this material is allowed to dry it disintegrates and looks similar to dandruff.

Figure 2:
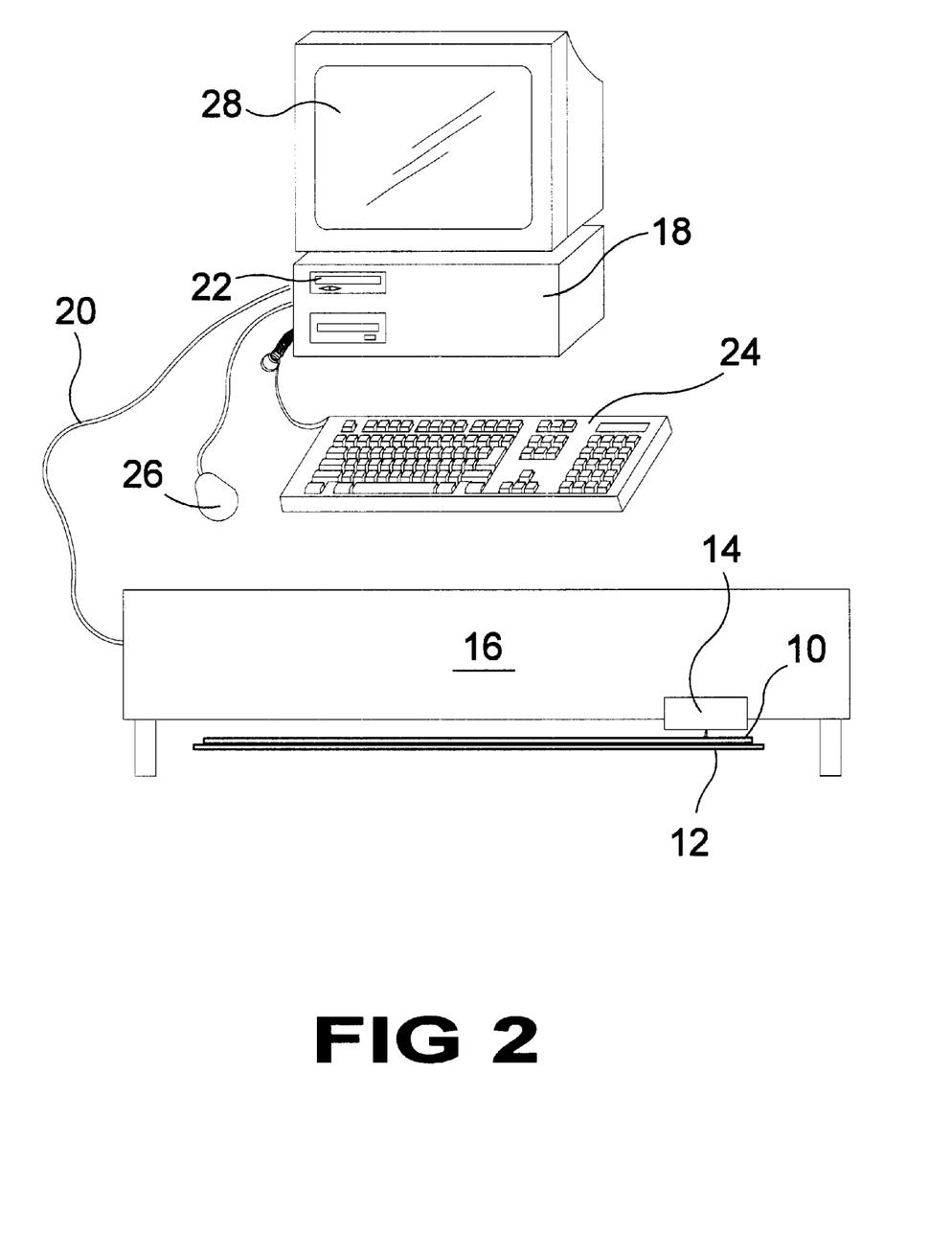
FIG. 2 is a side perspective view of the second step of the method of the present invention for forming a chocolate mold having art printed thereon, passing the edible paper through a printer.

After the edible paper 10 is positioned on and supported by the wax paper 12, a cartridge 14 of an ink jet printer 16 is filled with micro filtered food coloring. The color cartridge 14 is preferably filled with numerous colors of food coloring such as red, yellow, blue and black. The colors of food coloring filling the cartridge 14 will be determined based upon the colors needed to produce the desired image. Once the color cartridge 14 is filled, the edible paper 10 and wax paper 12 backing the edible paper 10 is loaded into the printer 16 as illustrated in FIG. 2. Any printer which is able to receive refillable cartridges containing food grade coloring may be used. At the time of loading the edible paper 10 should be damp and pliable so as to easily be loaded into the printer 18 and able to retain the ink used for printing. The printer 16 is connected to a processor 18 such as a computer via a connection cable 20. The processor 18 is used to generate the image or to read the image from a storage medium in a disk drive 22. The processor 18 is loaded with a graphics program allowing an image to be generated using a keyboard 24 and a mouse 26. The image being generated can be viewed on a monitor 28 connected to the processor 18. The processor 18, disk drive 20, keyboard 22, mouse 24 and monitor 28 are all conventional computer devices normally used to generate an image. Once the image is created, the printer 16 is used to print the image on the edible paper 10. When the printer 16 finishes printing the image on the edible paper 10, the edible paper 10 is removed from the printer 14. Upon removal of the edible paper 10 from the printer 14, the edible paper is cut to a desired size and shape.

Figure 3:
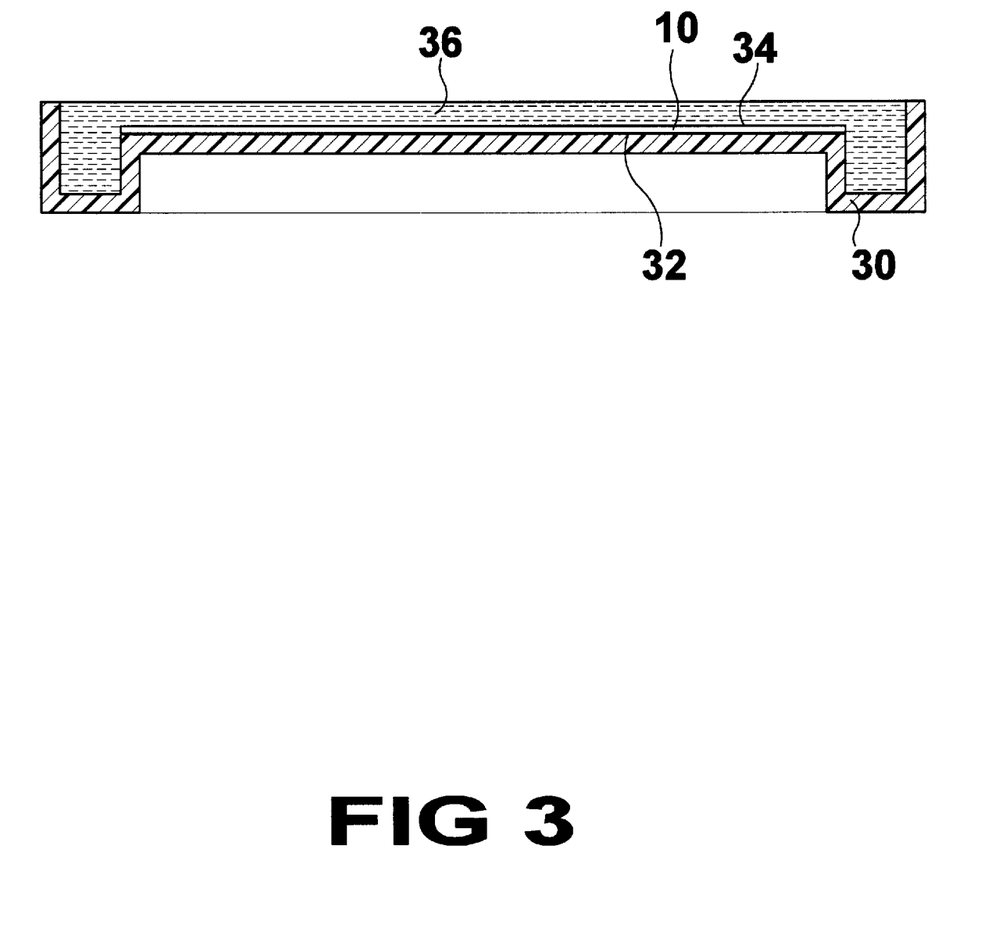
FIG. 3 is a side perspective view of the third step of the method of the present invention for forming a chocolate mold having art printed thereon, placing the edible paper in a mold and pouring chocolate thereon.

It is now time to create the mold. This can be performed in one of two preferred ways. A first method of forming the mold is to place the edible paper 10 within a mold 30 as illustrated in FIG. 3. The edible paper 10 is positioned at a desired location within the mold 30 corresponding to the position at which the image is desired to appear in the finished chocolate mold and the wax paper 12 is removed from a back side 34 of the edible paper 10. The edible paper 10 is positioned face side 32 down in the mold 30 so that any substance poured in the mold 30 will not cover the image printed on the face side 32. Once the edible paper 10 is positioned within the mold 30, melted chocolate 36 is poured into the mold 30 and over a back side 34 of the edible paper 10. The chocolate 36 is allowed to cool within the mold 30. As the chocolate 36 cools, a bond is formed between the chocolate 36 and the edible paper 10. The edible paper 10 is thus secured to the hardened chocolate 36. The hardened chocolate 36 and edible paper 10 bonded thereto are then removed from the mold 30.

Figure 4:
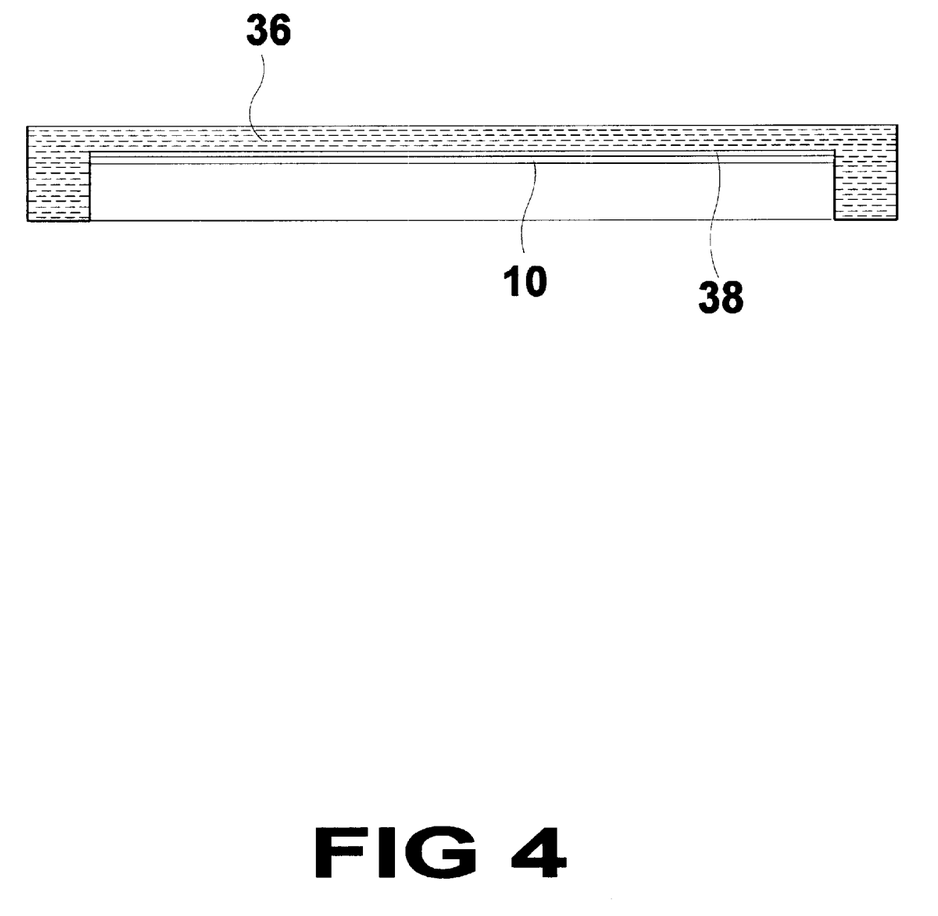
FIG. 4 is a side perspective view of the hardened chocolate mold having the edible paper bonded thereto by an edible adhesive substance.

Alternatively, the chocolate 36 may be poured into the mold 30 and allowed to harden without first placing the edible paper 10 into the mold 30. Once the chocolate has hardened it is removed from within the mold 30. At this time, the edible paper 10 may be secured in position to the hardened chocolate 36 using an edible adhesive 38. An exemplary adhesive is gum arabic. The edible adhesive 38 acts to glue the edible paper 10 to the chocolate after hardening as illustrated in FIG. 4. The edible adhesive 38 secures the back side 34 of the edible paper 10 to the chocolate 36 in a desired position to thereby provide a view of the image printed on the face side 32 of the edible paper 10.

Figure 5:
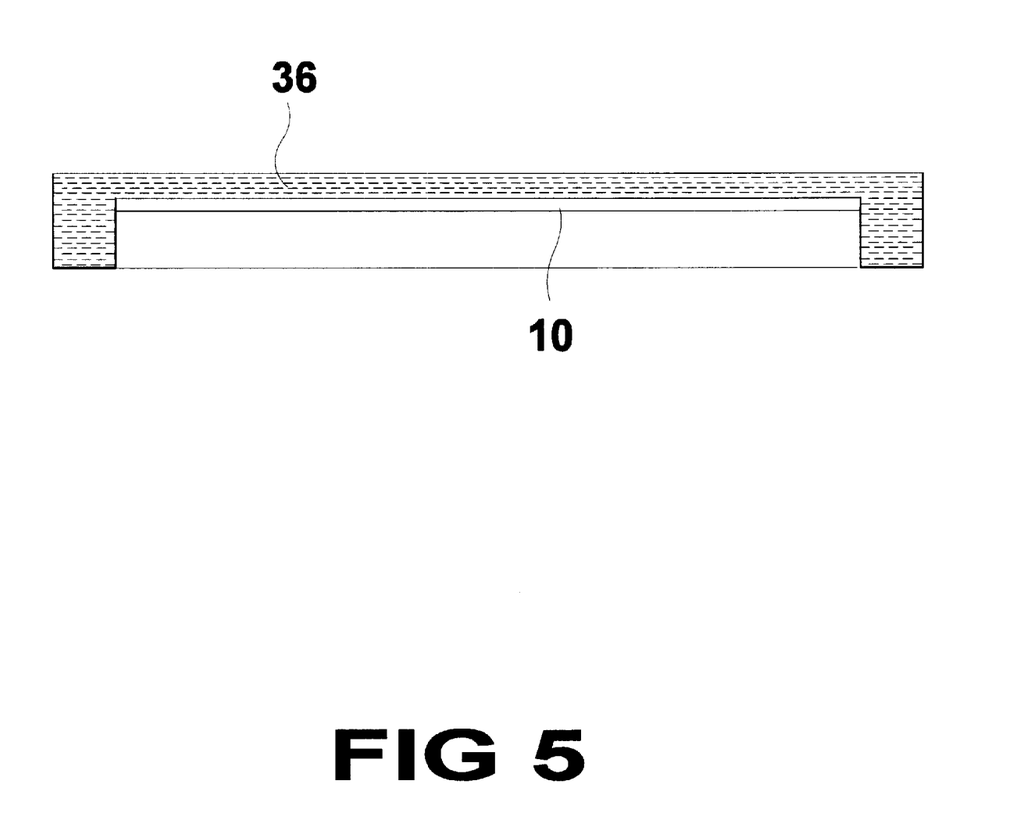
FIG. 5 is a side perspective view of the fourth step of the method of the present invention for forming a chocolate mold having art printed thereon, removing the hardened chocolate and edible paper bonded thereto from the mold.
Figure 6:
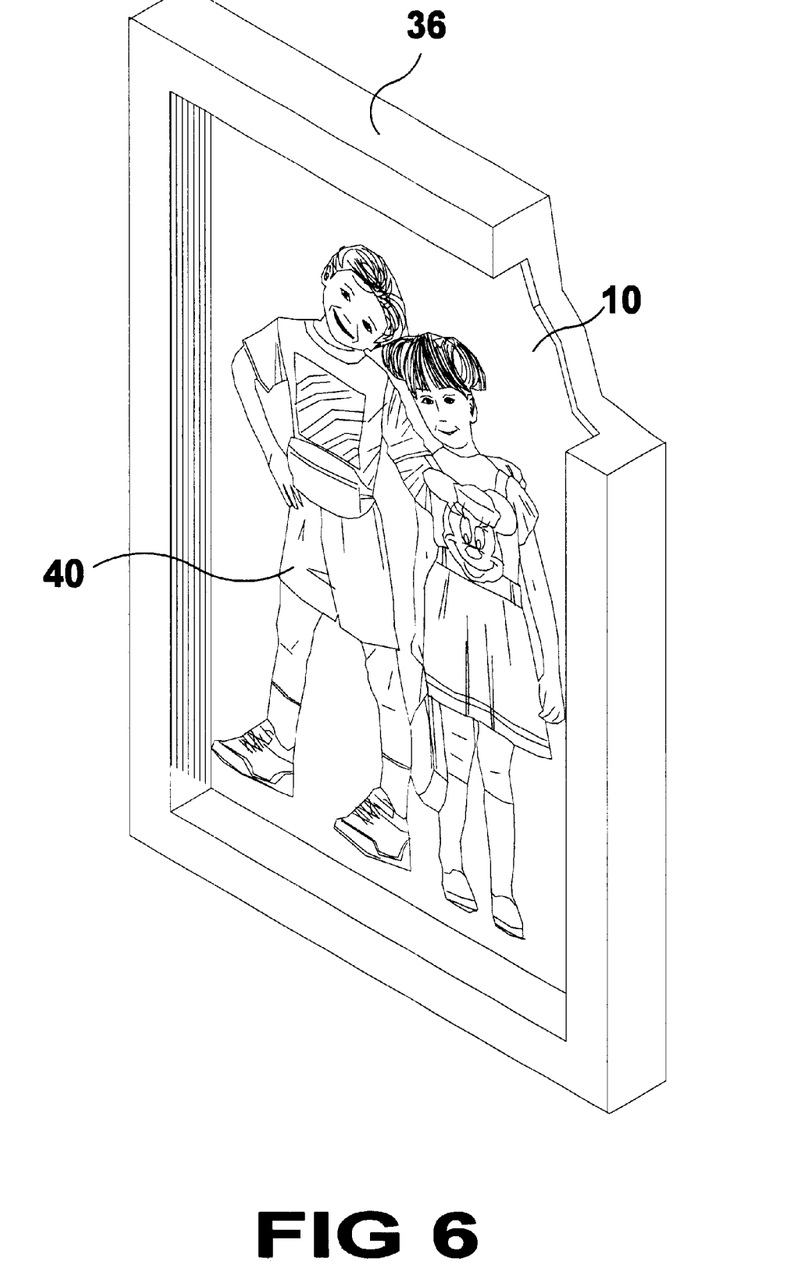
FIG. 6 is a front perspective view of the chocolate mold having art printed thereon formed by the method of the present invention.

A side view of the finished chocolate mold is illustrated in FIG. 5 and a front view of the finished chocolate mold is illustrated in FIG. 6. FIG. 5 shows a cross-sectional view of the hardened chocolate 36 and the edible paper 10 secured thereto when removed from the mold 30. As can be seen from this view, the edible paper 10 is bonded to the hardened chocolate 36 and held in position by the bond therebetween. The face side view of FIG. 6 shows an image 40 printed on the edible paper 10 by the printer 14 and the chocolate 36 in the shape of a picture frame. The edible paper 10 is bonded in position within the picture frame formed by the hardened chocolate 36 and the image 40 is clearly viewable. The hardened chocolate and image bonded thereto is then wrapped and ready for distribution and sale.

The detail of the image printed on the edible paper 10 may be controlled by the smoothness of the edible paper 10. The smoothness of the edible paper 10 may be controlled by further rolling of the edible paper 10 to decrease its thickness and remove any lumps which may have formed in the paper or application of a gel coating. The sharpness of the image may also be controlled by enhancing the dots per inch (dpi) of the printer 14. A printer 14 having a higher dpi is able to print a sharper more detailed image. The contrast provided to the image may also be altered by mixing a white chocolate in with the traditional brown chocolate, bonding the image in a pure white chocolate or mixing layers of white and dark chocolate together.

Figure 7:
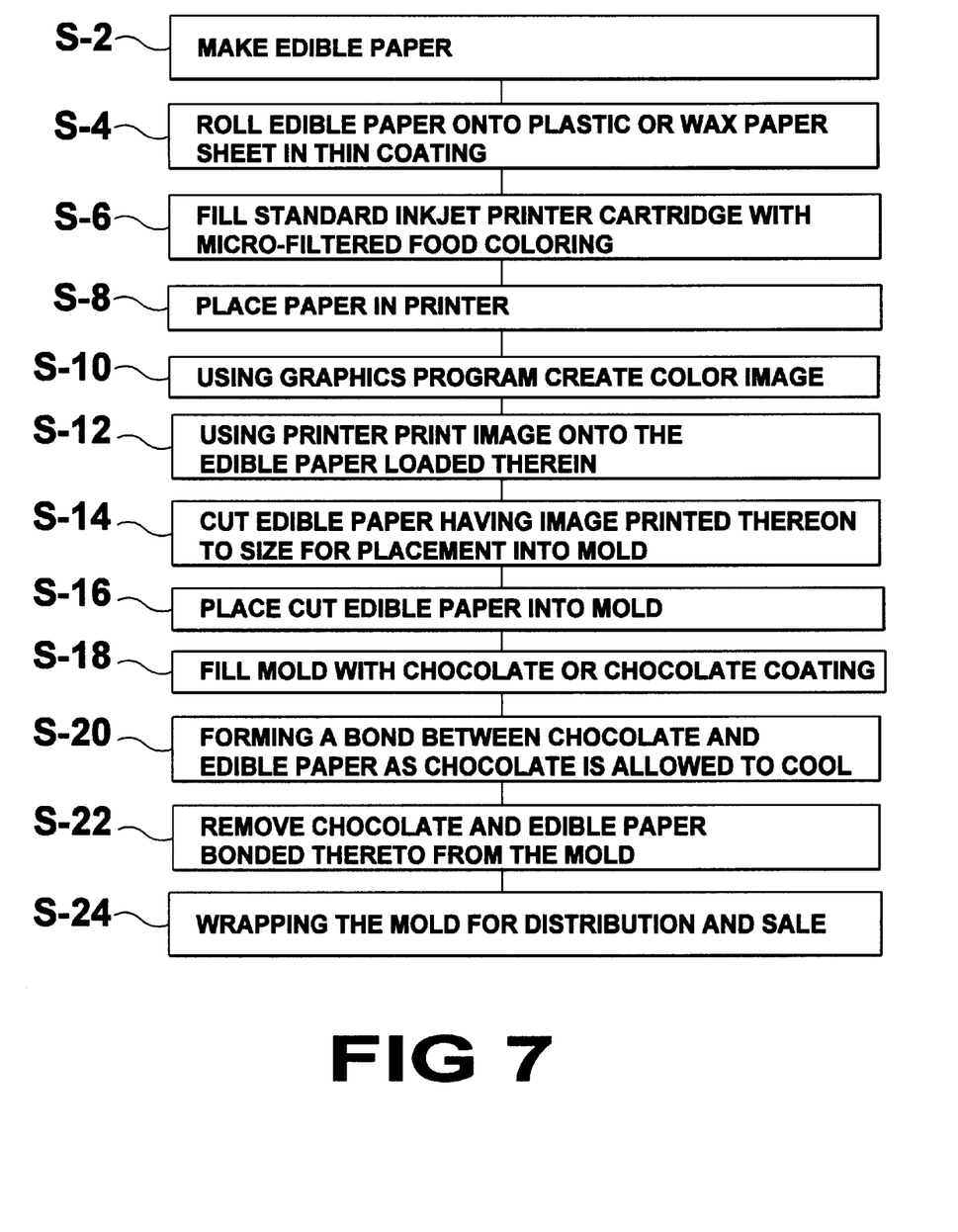
FIG. 7 is flow chart illustrating the method of the present invention for forming a chocolate mold having art printed thereon.

The method of forming the chocolate mold having an image 10 printed thereon will now be described with reference to the figures and specifically FIG. 7. In operation, the chocolate mold having art printed thereon 10 is made by first forming a piece of edible paper 10 as discussed in step S2. The edible paper 10 is then rolled onto a plastic or wax paper to provide support for the edible paper 10 as stated in step S4. The edible paper 10 is rolled to form a very thin layer when placed on the wax paper 12. The edible paper 10 is now ready to be printed on.

The printer 16 is now prepared to print on the edible paper 10 by loading the printer cartridge 14 with micro filtered food coloring as described in step S6 and the cartridge 14 is loaded into the printer 16. The edible paper and wax paper releasably secured thereto is then loaded into the printer 16 as discussed in step S8 and an image desired to be printed on the edible paper 10 is created on a computer using a graphics program as stated in step S10. Once the desired image is created, the printer 16 is controlled to print the image on the edible paper 10 loaded therein as described in step S12. Once the image is printed on the edible paper 10, the edible paper 10 and wax paper 12 releasably secured thereto are removed from the printer and the edible paper 10 is detached from the wax paper 12. The edible paper 10 is now cut to a desired size and shape for placement into the mold 30 as discussed in step S14. The cut edible paper 10 is now placed into a desired location of the mold 30 as stated in step S16. The edible paper 10 is positioned within the mold 30 such that the image 40 printed on the face side 32 thereof is against a side of the mold 30.

Now that the edible paper 10 is cut to size and positioned within the mold 30, it is time to pour chocolate 36 into the mold atop the edible paper 10 as discussed in step S18. The chocolate is then allowed to harden. As the chocolate 36 hardens, a bond is formed with the back side 34 of the edible paper 10 causing the chocolate 36 and edible paper 10 to be secured together as described in step S20. The hardened chocolate 36 and edible paper 10 secured thereto is now removed from the mold as stated in step S22.

Alternatively, the edible paper need not be positioned within the mold prior to pouring the chocolate therein but instead may be secured to the chocolate after the chocolate is allowed to harden and is removed from the mold 30. In this instance an edible adhesive will be applied to the chocolate and the back side of the edible paper and used to secure the edible paper 10 to a desired position on the chocolate 36.

The chocolate 36 and edible paper secured thereto is now ready to be wrapped as discussed in step S24. Once wrapped, the chocolate mold including the image printed thereon is ready to be distributed to vendors and sold.

From the above description it can be seen that the chocolate mold having art printed thereon of the present invention is able to overcome the shortcomings of prior art devices by providing a chocolate mold having art printed thereon which is able to provide a stable chocolate bar which does not flake. The method of forming the chocolate mold having art printed thereon bonds an image to a chocolate bar with a minimal amount of effort while adequately securing the image to the chocolate bar, wherein the securing of the image to the chocolate bar does not affect the consistency of the chocolate. The method of forming the chocolate mold having art printed thereon includes the step of printing the image on a piece of edible paper using a conventional color printer filled with food coloring for each color to be used on the image, placing the edible paper containing the image thereon within a mold and chocolate is poured thereon and allowed to harden and bonding the edible paper to the chocolate poured into the mold during hardening. Furthermore, the chocolate mold having art printed thereon of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method of forming a molded chocolate product having a printed image on a flat side thereof to form an edible framed picture, said method comprising the steps of:
   a) forming a piece of edible paper having a first side and an opposite second side;
   b) releasably securing a first side of the edible paper to an inedible backing sheet;
   c) using a printer having a cartridge containing micro filtered edible food coloring to print an edible image on said second side of the edible paper;
   d) placing the edible paper containing said printed edible image within and on a raised horizontal, central planar section of a mold with the image facing downwardly and contacting said planar section of the mold so that any substance poured into the mold will not cover the image printed on said second side, said planar section of the mold being surrounded by a downwardly extending recess, said mold having outer perimeter walls beyond the central planar section encompassing and defining the recess extending downwardly from the central planar section with said outer perimeter walls rising above said central planar section to define the space in the mold, followed by peeling said inedible backing sheet from said edible paper;
   e) pouring chocolate into the mold atop the edible paper and into said recess so that said chocolate fills said recess and completely covers the edible paper filling the space in the mold above as defined by said outer perimeter walls of the mold;

f) allowing the chocolate poured into the mold to harden in the mold while in contact with the edible paper such that the edible paper is bonded and secured to the hardened chocolate; and g) removing the hardened chocolate together with the bonded edible paper from the mold, said edible paper forming a bond with said hardened chocolate and said image facing away from said chocolate, the chocolate hardened in said recess taking the shape of a picture frame, framing said image to provide a picture-like structure, the edible chocolate framing a picture formed by said edible image.

2. The method of claim 1, wherein the chocolate is either brown chocolate or white chocolate or a mixture of brown and white chocolate.

3. The method of claim 1, wherein the backing sheet is made of either plastic or wax paper.

* * * * *